C. W. BELL.
MAIL BAG EXCHANGING APPARATUS.
APPLICATION FILED AUG. 22, 1910.
989,320.
Patented Apr. 11, 1911.
6 SHEETS—SHEET 1.
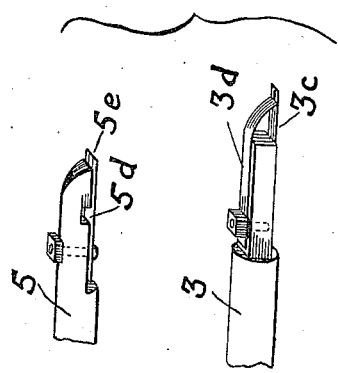
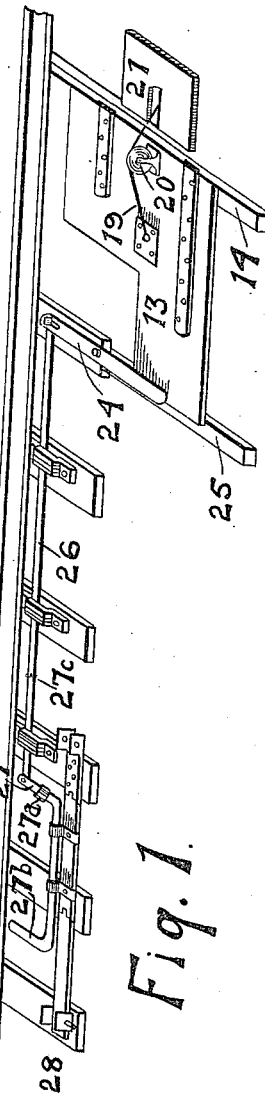
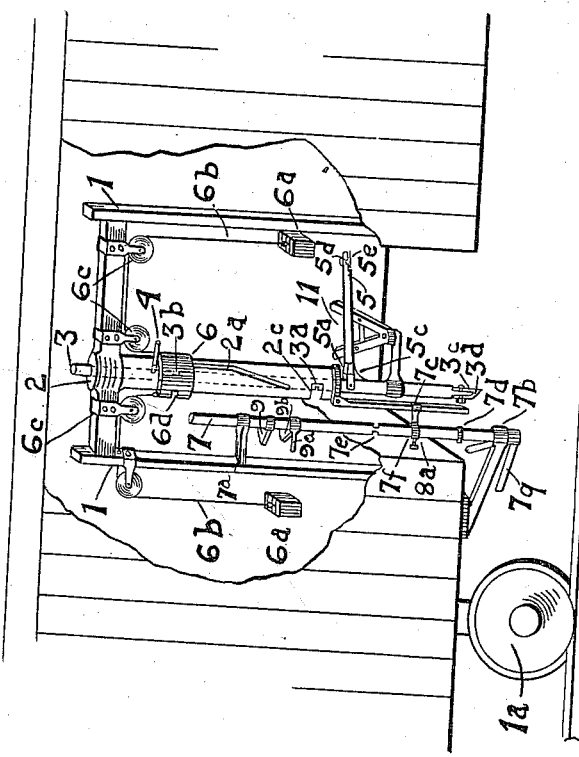
WITNESSES
INVENTOR

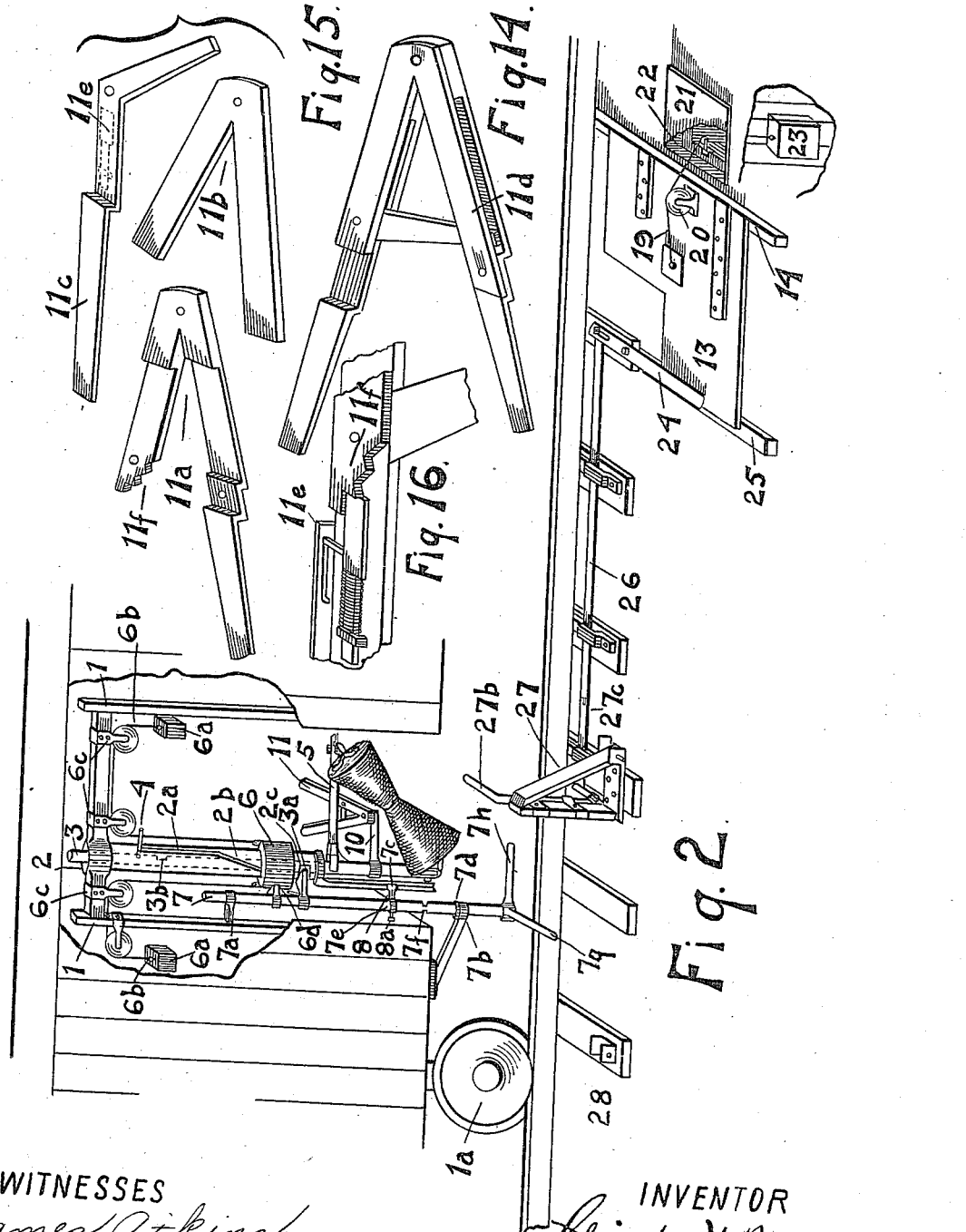

C. W. BELL.
MAIL BAG EXCHANGING APPARATUS.
APPLICATION FILED AUG. 22, 1910.

989,320.

Patented Apr. 11, 1911.
6 SHEETS—SHEET 3.

WITNESSES
INVENTOR
ATTY.

UNITED STATES PATENT OFFICE.

CLINTON W. BELL, OF BROWNHELM, OHIO.

MAIL-BAG-EXCHANGING APPARATUS.

989,320. Specification of Letters Patent. Patented Apr. 11, 1911.

Application filed August 22, 1910. Serial No. 578,282.

*To all whom it may concern:*

Be it known that I, CLINTON W. BELL, of Brownhelm, county of Lorain, and State of Ohio, have invented a new and useful Improvement in Mail-Bag-Exchanging Apparatus, of which the following is a specification.

This invention relates to mail-bag exchanging apparatus.

The object of the invention is to provide a mail-bag exchanging device which is of simple construction, practical in operation, and adapted, when not in operation, to be laid flat on the ground and housed, whereby it may thus be temporarily removed from operating position, as contradistinguished from the usual forms of mail-cranes and other like devices permanently built contiguous to the track and which are a constant menace to train-crews, mail-messengers, passengers and pedestrians.

Another object of the invention is to provide a car with apparatus adapted to deliver a bag through an opening in the bottom of the car to an underground receptacle or pit at the side of the tracks, whereby the ground-supported part of the apparatus, when set, would extend upwardly from the ground only a comparatively short distance.

A further object of the invention is to provide an underground receptacle or pit at the side of the track adapted to temporarily store the mail pouch which is to be delivered to the train, and which includes apparatus automatically actuated for delivering said pouch to the car and simultaneously receive and hold a pouch delivered to it from the car.

A further object of the invention is to provide means mounted at the side of the track on the ground for automatically operating apparatus carried by the car to effect a delivery of a bag from the car to ground-supported catching apparatus, and which means are adapted to effect automatic operation of the bag-delivering and receiving apparatus disposed at the side of the track.

With these and other objects in view, the invention resides in various novel details of construction and arrangement, as hereinafter fully described and claimed.

Figure 3:
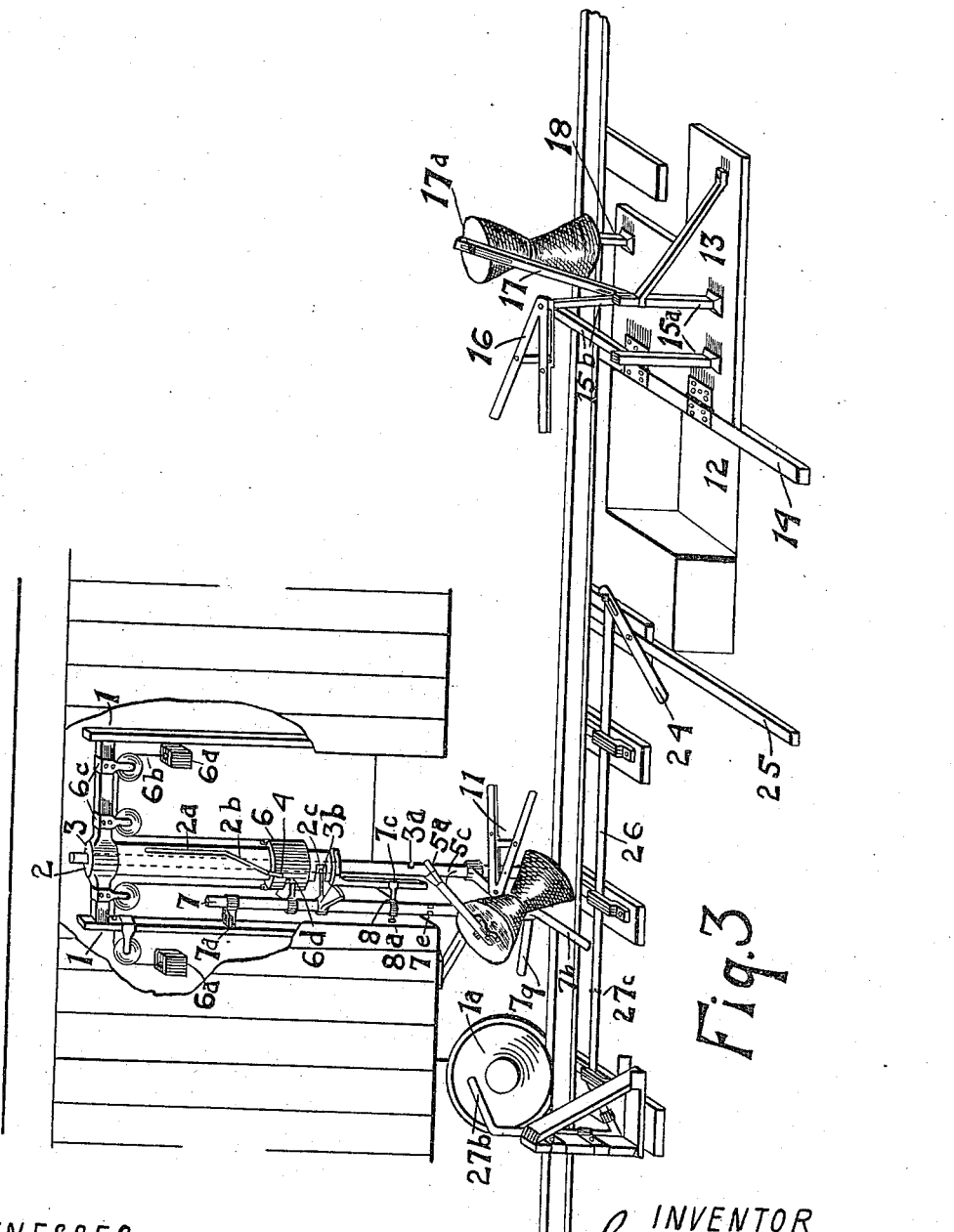
Figure 4:
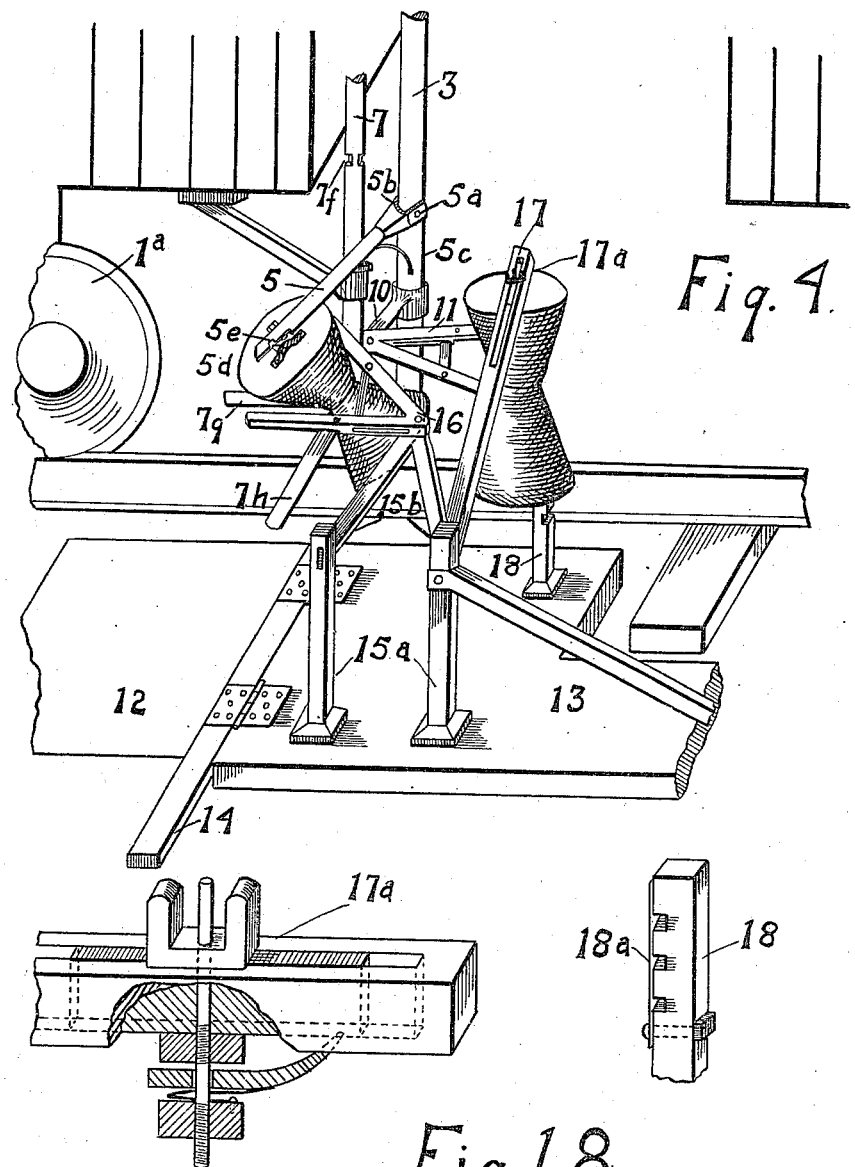
Figure 5:
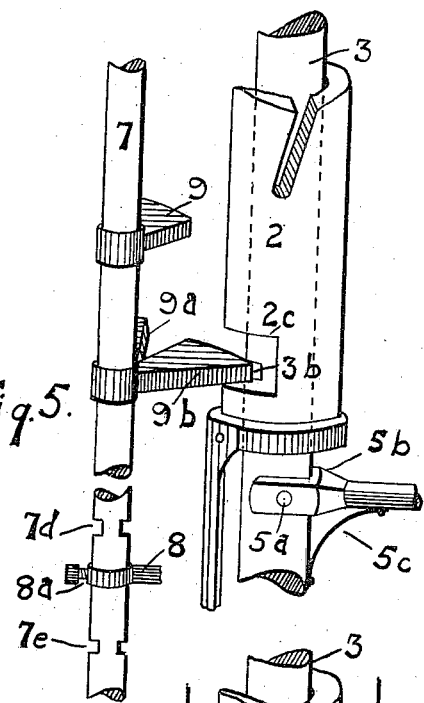
Figure 6:
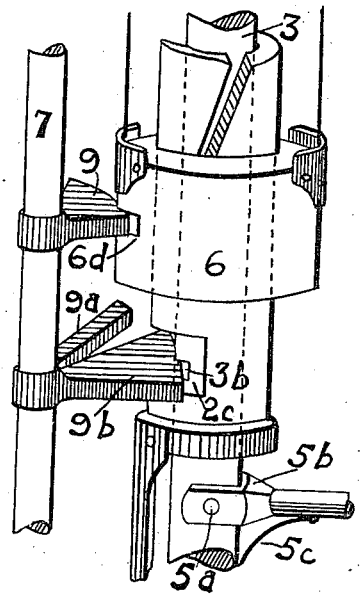
Figure 7:
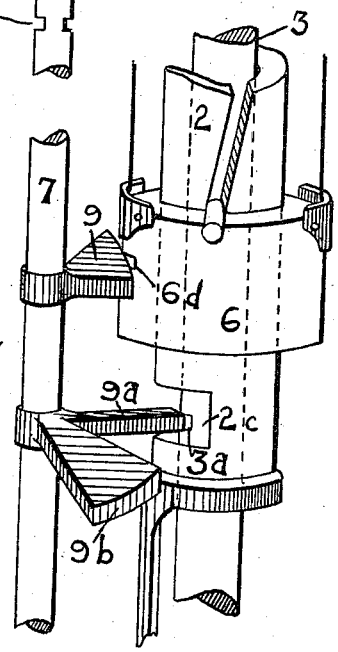
Figure 8:
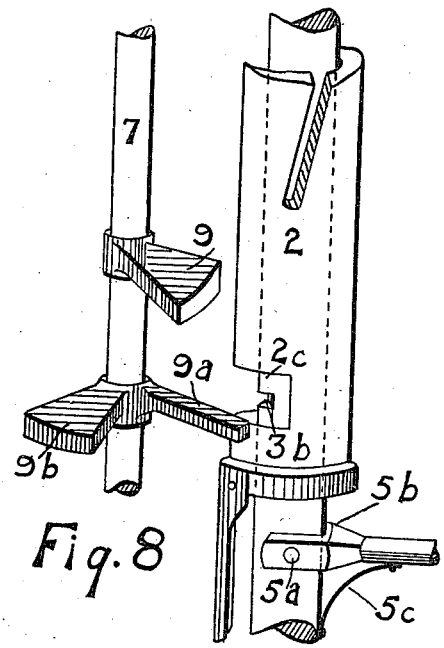
Figure 9:
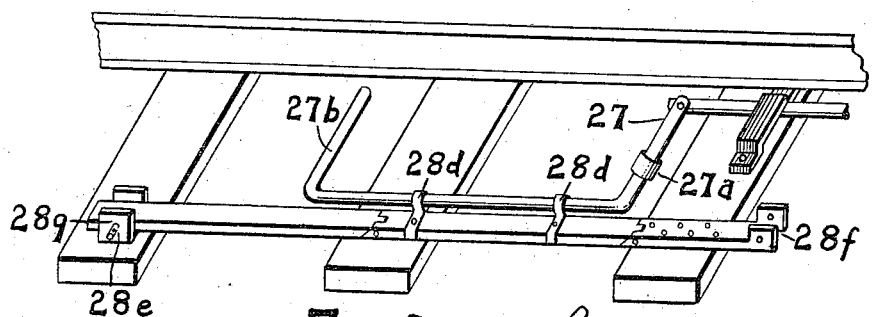
Figures 10, 11:
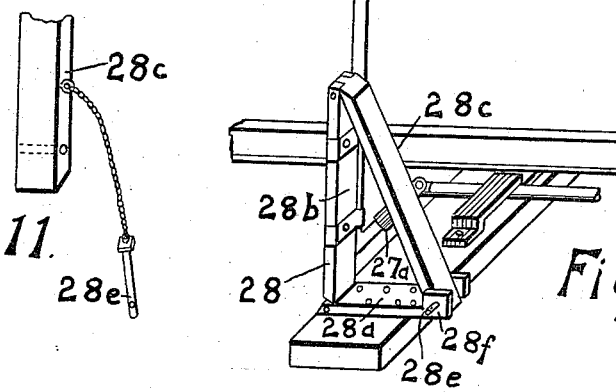
Figure 12:
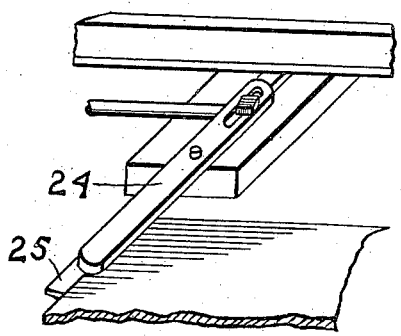
Figure 13:
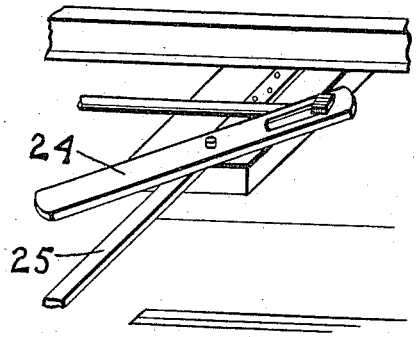

In the accompanying drawings, Figure 1 is a view in perspective illustrating a portion of the car, a part of which is broken away to show the car-apparatus, constituting a part of my improvement, and illustrating the track-apparatus; both parts of the apparatus being displayed in their unset positions. Fig. 2 is a similar view showing the parts in their set position. Fig. 3 is a similar view showing the parts of the car and track apparatuses in the position they assume after being actuated and just before they engage to effect an exchange of the mail-pouches. Fig. 4 is an enlarged fragmentary view showing the parts in the act of exchanging the pouches. Figs. 5 to 8 are fragmentary detail views showing the controlling device of the car-apparatus in its several operative and inoperative positions. Fig. 9 is a fragmentary view in perspective of the trip-mechanism forming a part of the track-apparatus, and showing the same in its unset position. Fig. 10 is a similar view showing said trip-mechanism in its set position. Fig. 11 is a fragmentary detail view of the trip locking device. Fig. 12 is a fragmentary view of the door-latching device of the track apparatus in latched position. Fig. 13 is a similar view of the same in unlatched position. Fig. 14 is a view in perspective of the pouch-catching device, one of which is employed in both the car-apparatus and in the track-apparatus. Fig. 15 is a collective view in perspective of the elements forming the pouch-catching device, unassembled. Fig. 16 is a fragmentary inverted view of the latching mechanism forming a part of the pouch-catching apparatus. Fig. 17 is a fragmentary view in perspective of the bag-holding device forming a part of the car-apparatus. Fig. 18 is a similar view of the bag-holding device of the track-apparatus.

In these drawings: *Car-apparatus.*—Referring to Figs. 1 to 8 and 14 to 16, the numeral 1 designates a support or frame upon which is mounted a casing 2 extending vertically from the top to the bottom of the car, in any convenient location therein, and here shown as just in advance of the rear truck 1$^a$. This casing is grooved, as at 2$^a$ and 2$^b$, on opposite sides, and is provided with a recess 2$^c$ at its lower end. Within the casing, a bar 3 is slidably mounted and carries at its upper end a cross-arm 4 which is adapted to slide in the grooves 2$^a$ and 2$^b$, which direct its motion while descending. The bar is also provided with two slots 3$^a$ and 3$^b$, for purposes hereinafter described. The lower portion of the bar 3 carries a bag-holding device consisting of an arm 5 pivoted to the bar at $5^a$ and limited in its upward movement by an abutment $5^b$, and forced upwardly against the abutment by a strap-spring $5^c$. The lower end of the bar 3 is provided with two springs $3^c$ and $3^d$. The arm 5 is at its end provided with a recess $5^d$ and bar-spring $5^e$. The mail-pouch or bag is to be held by these means between said arm 5 and the bar 3, and this structure constitutes a pouch or bag-holding device. Intermediate of the arms 3 and 5 on the bar 3 is mounted a bracket 10, on the outer end of which is mounted a bag or pouch catcher 11 comprising a V-shaped member $11^a$, upon which is mounted a V-shaped element $11^b$ and a lever $11^c$ pivoted at one end between the member $11^a$ and the element $11^b$ and at its other end projecting in a housing $11^b$ formed between the member $11^a$ and the element $11^b$, as clearly shown in Fig. 15. Mounted on the lower face of the lever $11^c$ is a spring-actuated latch $11^e$ adapted to engage in notches $11^f$ formed in the end of the shorter limb of the V-shaped member $11^a$. Encircling the casing 2 is a collar 6 which is maintained in its upper position by weights $6^a$, or the like, attached to ropes $6^b$ passing over pulleys $6^c$ mounted on the frame 1 and free to move upon the latter vertically. This collar is provided with a slot $6^d$ for purposes hereinafter described.

So much of the apparatus as has been described constitutes the bag-supporting and positioning device of the car-carried part of the apparatus.

Arranged in juxtaposition to the casing 2 is a bar 7 mounted in brackets $7^a$, $7^b$, $7^c$, and free to move vertically and rotatively. The bar 7 is provided toward its lower end with lugs $7^d$ which are adapted to engage the brackets $7^b$ when the bar is lowered and they limit its downward movement. The bar is also provided with circumferential grooves $7^e$ and $7^f$, which are adapted to be engaged by a clamping ring $8^a$ carried by an arm 8 depending from the casing 2. The construction of these parts is such that the bar 8 is held against vertical movement by said clamping ring, but is permitted free rotative movement. At the lower extremity of the bar 7 below the bracket 17 are two radiating arms $7^g$ and $7^h$ the functions of which will presently appear. The bar 7 at its upper end is provided with three arms 9, $9^a$ and $9^b$, radiating therefrom at different angles. The arms 9 and $9^b$ are segmental in form, as shown in Figs. 5 to 8. These three arms are adapted to engage, respectively, in the recesses $2^c$ in the casing 2, in the recess $6^d$ in the collar 6, and in the slots $3^a$ and $3^b$ whereby these several elements are controlled in respect to their downward movement, as hereafter explained. This bar 7 and its adjunctive parts constitute a controlling member, the operation and function of which will presently be explained.

*Track-apparatus.*—Referring to Figs. 1 to 4 and 9 to 13, the numeral 12 designates a pit disposed at the side of the track and which is normally covered by a door 13, hinged to a frame 14. Secured to the lower face of the door and suitably braced, is a standard or support 15 consisting of two uprights $15^a$ and two horizontally-extending converging arms $15^b$. At the junction of these arms is mounted pouch-catching apparatus 16, constructed and operating similarly to the corresponding pouch-catcher 11 forming a part of the car-apparatus. Extending upwardly from the support 15, at an angle, is a bar 17, provided with a pouch-holding device $17^a$, shown in detail in Fig. 18. Upstanding from the lower face of the door 13 in juxtaposition to the standards $15^a$, is a post 18, provided with a pouch-holding device $18^a$ shown in detail in Fig. 18. On the opposite side of the door is attached a chain or rope 19, passing over a pulley 20, and through an aperture in a cover 21 of a secondary pit 22, in which a weight 23 attached to the other end of the rope 19 is housed. This constitutes the door-opening device. To latch the door against the action of the door-opening device I provide a latching-lever 24, fulcrumed on a supporting strip 25, secured to a tie or the like at the end of the pit opposite to the door hinge. Connecting with the lever is an actuating rod 26 which, at its opposite end is pivoted to a trip-member 27, provided intermediate of its ends with a coupling $27^a$, to permit the free end of said member to turn therein, for purposes presently to be described. Said member 27 has an angular extension $27^b$ constituting a contact-element of the track-apparatus. As shown in Fig. 10, a trip-supporter 28 is mounted on one end of the tie, or other suitable part, and comprises two sections $28^a$, $28^b$, $28^c$ hinged together. The section $28^a$ is secured to the tie; the section $28^b$ carries rings $28^d$ by which the trip-member is loosely supported; and the section $28^c$ carries at its free end a locking-pin $28^e$, adapted to be inserted in apertures $28^f$, in lugs formed on the section $28^a$, or in apertures in lugs on the block $29^g$ secured to an adjacent tie. As will be noted by referring to Figs. 9 and 10, the trip-supporter, by reason of the construction just described, is capable of being extended (as shown in Fig. 9) or folded for its operative function (as shown in Fig. 10). This constitutes the trip-mechanism of the track-apparatus.

*Operation.*—When the operator desires to set the car-apparatus, he lowers bar 7, first releasing the clamping-ring $8^a$, until the lugs $7^d$ engage the bracket $7^b$, whereupon he manually turns said bar 7 so that the lowermost arm 9ᵇ will engage in the slot 3ᵃ in bar 3. He then lowers the collar 6 until the recess 6ᵃ therein is opposite the uppermost arm 9, whereupon he gives the bar 7 a further turn to bring it into register with said recess 6ᵃ. The dimensional area of the arm 9ᵇ is such that it will remain in engagement with the slot 3ᵃ while the arm 9 is moving into the recess 6ᵃ in the collar 6. The actuation of the bar 7 in the manner just described will have positioned the radiating arm 7ᵍ at right angles to the direction of travel of the car, that is to say, to the position shown in Fig. 2. It will be understood that the parts are now in the position they must occupy to coöperate with those constituting the track-apparatus. Assuming that a mail-train is about to approach, the station attendant releases the latch 24 to permit the door 13 to open, thus bringing the pouch-catching and holding devices mounted thereon to the surface. This releasing is effected by unlocking the locking-pin 28ᵉ, whereupon the sections 28ᵃ, 28ᵇ and 28ᶜ, may be folded into the position shown in Fig. 10, which incidentally raises the trip-member 27 into its vertical position and permits it to be actuated by the attendant to operate the latch 24, as aforementioned. The pouch-holding devices 17ᵃ and 18ᵃ now being accessible to the attendant, he secures the pouch to the same. He then closes the door 13, which positions the pouch in the pit 12 and thus out of sight, and relatches the door, which operation sets the trip-arm 27ᵇ (through the actuating rod 26), at an angle to the track. The parts of the car and track apparatus are now positioned to coöperate to effect the exchange of the pouches in the car and the pit: As the car passes the trip 28, the arm 7ᵍ on the lower end of the bar 7 of the car-apparatus engages the arm 27ᵇ of the trip-device and rotates said bar 7 to disengage the arm 9ᵇ from the lower slot 3ᵇ in the bar 3, thus permitting said bar 3 (on which the pouch-holding and catching devices are mounted) to drop to its lowermost position. While dropping, the cross-bar 4 at the upper end of said bar 3 travels in the grooves 2ᵃ. When said bar 4 reaches the inclined portions of said grooves 2ᵃ, the latter will tend to turn bar 3 and, thus, position the pouch-supporting arm 5 beyond the plane of the side of the car and into the path of the pouch-catching arm of the track-apparatus. The turning of the bar 7, as just described, brings the arm 9ᵃ into engagement with the uppermost recess 3ᵇ in the bar 3, thus locking said bar against vertical motion while the exchange of the pouches is being effected, but not turning said bar 7 sufficiently to displace the arm 9 from the recess 6ᵃ in the collar 6. The delivery and catching of the respective pouches will then be effected in the usual way. The engagement of the arm 7ᵍ with the trip-arm 27ᵇ will turn the same around and actuate the rod 26 and thereby operate the latch 24 to release the door 13 and permit it to be opened by the weights 23 connecting with the door. This positions the pouch-catching and delivery devices in the path of travel of the pouch-catching and delivery devices carried by the car. When the arm 7ᵍ has engaged with the trip arm 27ᵇ, it will have turned the bar 7 so that the arm 7ʰ will have been moved into the position previously occupied by the arm 7ᵍ. Then, as the car continues on its onward travel, said arm 7ʰ will engage the upright tion previously occupied by the arm 7ᵍ. to disengage the arm 9 from the recess 6ᵃ in the collar 6 and, simultaneously, the arm 9ᵃ will have been disengaged from the recess 3ᵇ in the bar 3. This will release the collar 6 and bar 3 and permit the cross-arm 4 to engage the upper portion of the collar 6 and thereby be drawn up into the car by the weights 6ᵃ connecting with the collar. This operation of the parts will have returned the parts of the car-apparatus to their original position as shown in Fig. 1.

While I have herein described my invention in detail, it is to be understood that I do not limit myself to such details, except in so far as they may be specified in the claims.

Having thus described my invention, its construction and its mode of operation, what I claim as new and desire to secure by Letters-Patent is:

1. In a mail-bag exchanging apparatus, the combination with a vertically movable car-carried bag-supporting and positioning device having an upper inactive position and a lower bag-exchanging position, means for controlling the movement of said device, a ground-sustained bag-supporting and positioning device, occupying a position in a plane corresponding to that of the bag-exchanging position of said car-carried device, and means connecting with said ground-sustained device and disposed in the path of said controlling means for actuating said ground-device to effect its operation to catch a pouch sustained by said car-supported device and to deliver a second pouch thereto.

2. In a mail-bag exchanging apparatus, the combination with a vertically movable car-carried bag-supporting and positioning device, means for controlling the movement of said device, including mechanism for actuating said bag-supporting device into a plane below that of its normal position, a ground-sustained bag-supporting and positioning device, means for positioning said ground-device in a plane corresponding to that of the car-carried device, and means connecting with said ground-sustained device and adapted to occupy a position in the path of said controlling means to automatically actuate said ground-sustained device and effect an exchange of the bags carried by said car and ground-supported devices.

3. In a mail-bag exchanging apparatus, the combination with a vertically movable car-carried bag-supporting and positioning device normally occupying an elevated position, means connecting therewith for releasing said device and dropping it into a plane relatively lower than normal, means for controlling said releasing-means, a ground-sustained bag-supporting and positioning device, mechanism connecting therewith for actuating said last-mentioned device, and means carried by said actuating mechanism and controlling means which, when engaged, effect an exchange of the bags supported by said devices.

4. In a mail-bag exchanging apparatus, a car-carried bag-supporting and positioning device normally occupying an elevated position and movable into a relatively lower bag-exchanging position, mechanism connecting with said device for moving the same into and out of exchanging position, a control member operatively connecting with said mechanism, and a trip-mechanism adapted to engage said control member to actuate said bag-supporting and positioning device.

5. In a mail-bag exchanging apparatus, a vertically movable car-carried bag-supporting and positioning device, mechanism connecting with said device for actuating the same from an upper to a lower position and for moving the same into and out of exchanging position, a control member operatively connecting with said mechanism, a trip-mechanism adapted to engage said control member to actuate said bag-supporting and positioning device, and a ground-sustained bag-supporting and positioning device for securing the bag delivered by said car-carried bag-positioning device.

6. In a mail-bag exchanging apparatus, a vertically movable car-carried bag-supporting and positioning device, mechanism connecting with said device for actuating the same from its upper normal position to a relatively lower position and for moving the same into and out of exchanging position, a control member operatively connecting with said mechanism, a trip-mechanism adapted to engage said control member to actuate said bag-supporting and positioning device, and a ground-sustained bag-supporting and positioning device under the control of said trip-mechanism to position the same.

7. In a mail-bag exchanging apparatus, a vertically movable car-carried bag-supporting and positioning device, means for moving said device from an upper normal position to a relatively lower bag-exchanging position mechanism normally out of engagement with said device and adapted to be engaged therewith to actuate the same, a ground-supported trip-mechanism adapted to be engaged by said actuating mechanism to control its movement, and a bag-catching device under the control of said trip-mechanism.

8. In a mail-bag exchanging apparatus, the combination of a vertically movable car-carried bag-supporting and positioning device normally occupying an elevated position and movable to a relatively lower bag-exchanging position and comprising a slidable member and a controlling-member arranged in juxtaposition to said slidable member and adapted to be brought into engaging position therewith, a trip mechanism operable by said controlling-member and adapted, in turn, to actuate said controlling-member, and a mail-bag catching device operatively associated with said trip mechanism.

9. In mail-bag exchanging apparatus, the combination of a vertically movable car-carried bag-supporting and positioning device normally occupying an elevated position and movable to a relatively lower bag-exchanging position and comprising a slidable member and a controlling-member arranged in juxtaposition to said slidable member and adapted to be brought into engaging position therewith, a trip mechanism operable by said controlling-member and adapted, in turn, to actuate said controlling-member, a mail-bag catching device operatively associated with said trip mechanism, and means associated with said bag-catching device for delivering a bag to said car-carried bag-supporting device.

10. In a mail-bag exchanging apparatus, the combination of a vertically movable car-carried bag-supporting and positioning device normally occupying an elevated position and movable to a relatively lower bag-exchanging position and comprising a slidable member and a controlling-member arranged in juxtaposition to said slidable member and adapted to be brought into engaging position therewith, and a bag-catching device operatively associated with and positioned by said slidable member, a trip mechanism operable by said controlling-member and adapted, in turn, to actuate said controlling-member, and a mail-bag catching device operatively associated with said trip-mechanism.

11. In a mail-bag exchanging apparatus, a car-carried bag-supporting and positioning device comprising a casing, a slidable member having a vertical and rotative movement in said casing, a trip-engaging controlling-member arranged in juxtaposition to and adapted to be engaged with said slidable member, a bag-holding device carried by said member and adapted to be positioned thereby, a bag-catching device disposed contiguous to said bag-holding device, in combination with a ground-supported trip-mechanism adapted to be arranged in the path of and to be engaged by said trip-engaging member, and a ground-sustained bag-supporting and positioning device adapted to be actuated by said trip-mechanism.

12. In a mail-bag exchanging apparatus, a car-carried bag-supporting and positioning device comprising a casing, a slidable member having a vertical and rotative movement in said casing, a member encircling said casing and said slidable member, a trip-engaging controlling-member arranged in juxtaposition to and adapted to be engaged with said slidable member, a bag-holding device carried by said member and adapted to be positioned thereby, a bag-catching device disposed contiguous to said bag-holding device, in combination with a ground-supported trip-mechanism adapted to be arranged in the path of and to be engaged by said trip-engaging member, and a ground-sustained bag-supporting and positioning device adapted to be actuated by said trip-mechanism.

13. In a mail-bag exchanging apparatus, a car-carried bag-supporting and positioning device comprising a casing, a slidable member having a vertical and rotative movement in said casing, a member encircling said casing and said slidable member, a trip-engaging controlling member arranged in juxtaposition to and adapted to be engaged with said slidable member, means for maintaining said encircling member and said slidable-member in operative position, a bag-holding device carried by said member and adapted to be positioned thereby, a bag-catching device disposed contiguous to said bag-holding device, in combination with a ground-supported trip-mechanism adapted to be arranged in the path of and to be engaged by said trip-engaging member, and a ground-sustained bag-supporting and positioning device adapted to be actuated by said trip-mechanism.

14. In a mail-bag exchanging apparatus, a car-carried bag-supporting and positioning device comprising a casing, a slidable member having a vertical and rotative movement in said casing, a member encircling said casing and said slidable member, a trip-engaging controlling member arranged in juxtaposition to and adapted to be engaged with said slidable member, means for maintaining said encircling member and said slidable member in operative position, means for releasing said encircling and slidable members and returning them to normal position, a bag-holding device carried by said member and adapted to be positioned thereby, a bag-catching device disposed contiguous to said bag-holding device, in combination with a ground-supported trip-mechanism adapted to be arranged in the path of and to be engaged by said trip-engaging member, and a ground-sustained bag-supporting and positioning device adapted to be actuated by said trip-mechanism.

15. In a mail-bag exchanging apparatus, a car-carried bag-supporting and positioning device comprising a casing, a slidable member having a vertical and rotative movement in said casing, a trip-engaging controlling-member arranged in juxtaposition to and adapted to be engaged with said slidable member, a bag-holding device carried by said member and adapted to be positioned thereby, a bag-catching device disposed contiguous to said bag-holding device, in combination with a ground-supported trip-mechanism adapted to be arranged in the path of and to be engaged by said trip-engaging member, a ground-sustained bag-supporting and positioning device adapted to be actuated by said trip-mechanism, and comprising a hinged member, and a bag-holding device mounted thereon.

16. In a mail-bag exchanging apparatus, a car-carried bag-supporting and positioning device comprising a casing, a slidable member having a vertical and rotative movement in said casing, a trip-engaging controlling-member arranged in juxtaposition to and adapted to be engaged with said slidable member, a bag-holding device carried by said member and adapted to be positioned thereby, a bag-catching device disposed contiguous to said bag-holding device, in combination with a ground-supported trip-mechanism adapted to be arranged in the path of and to be engaged by said trip-engaging member, a ground-sustained bag-supporting and positioning device adapted to be actuated by said trip-mechanism and comprising a hinged member, a bag-holding device mounted thereon, and a bag-catching device juxtaposed to said holding device.

17. In a mail-bag exchanging apparatus, a car-carried bag-supporting and positioning device comprising a casing, a slidable member having a vertical and rotative movement in said casing, a trip-engaging controlling-member arranged in juxtaposition to and adapted to be engaged with said slidable member, a bag-holding device carried by said member and adapted to be positioned thereby, a bag-catching device disposed contiguous to said bag-holding device, in combination with a ground-supported trip-mechanism adapted to be arranged in the path of and to be engaged by said trip-engaging member, a ground-sustained bag-supporting and positioning device adapted to be actuated by said trip-mechanism and comprising a hinged member, a bag-holding device mounted thereon, a bag-catching device juxtaposed to said holding device, and a latching-device adapted to engage said hinged member.

18. In a mail-bag exchanging apparatus, a car-carried bag-supporting and positioning device comprising a casing, a slidable member having a vertical and rotative movement in said casing, a trip-engaging controlling-member arranged in juxtaposition to and adapted to be engaged with said slidable member, a bag-holding device carried by said member and adapted to be positioned thereby, a bag-catching device disposed contiguous to said bag-holding device, in combination with a ground-supported trip-mechanism adapted to be arranged in the path of and to be engaged by said trip-engaging member, a ground-sustained bag-supporting and positioning device adapted to be actuated by said trip-mechanism and comprising a hinged member, a bag-holding device mounted thereon, a bag-catching device juxtaposed to said holding device, and a latching-device associated with and operated by said trip-mechanism and adapted to latch said hinged member.

19. In a mail-bag exchanging apparatus, a car-carried bag-supporting and positioning device comprising a casing, a slidable member having a vertical and rotative movement in said casing, a trip-engaging controlling-member arranged in juxtaposition to and adapted to be engaged with said slidable member, a bag-holding device carried by said member and adapted to be positioned thereby, a bag-catching device disposed contiguous to said bag-holding device, in combination with a ground-supported trip-mechanism adapted to be arranged in the path of and to be engaged by said trip-engaging member, a ground-sustained bag-supporting and positioning device adapted to be actuated by said trip-mechanism and comprising a hinged member, a bag-holding device mounted thereon, a bag-catching device juxtaposed to said holding device, a latching-device associated with and operated by said trip-mechanism and adapted to latch said hinged member, and means for actuating said hinged member when said latching-device is actuated by the trip-mechanism.

20. In a mail-bag exchanging apparatus, a vertically movable car-carried bag-supporting and positioning device, normally occupying an elevated position and movable to a relatively lower bag-exchanging position and a controlling-member operatively associated with and adapted to engage said device, in combination with a trip-mechanism including a support, a trip-member mounted on said support, and an arm carried by said trip-member, a ground-sustained bag-supporting and positioning device, and means operatively associated with said device and adapted to be actuated by said trip-member to operate said device.

21. In a mail-bag exchanging apparatus, the combination of a car-carried bag-supporting and positioning device comprising a casing, a slidable bar movably disposed in said casing, a collar encircling said casing and bar, and means associated with said collar and adapted to elevate it and said bar, a bag-holding device carried by said bar, a bag-catching device also carried by said bar, a controlling-member arranged in juxtaposition to said bar and collar and adapted to engage therewith, a trip-mechanism adapted to be actuated by said controlling member and to actuate said controlling-member and comprising a support, a trip-arm, and an actuating-rod, a latching-device operatively associated with and adapted to be actuated by said trip-mechanism, a ground-supported bag-supporting and positioning device comprising a hinged door, means for actuating said door when unlatched, and bag-holding and bag-catching devices mounted on said hinged door.

22. In a mail-bag exchanging apparatus, the combination of a car-carried bag-supporting and positioning device comprising a casing, a slidable bar movably disposed in said casing, a collar encircling said casing and bar, and means associated with said collar and adapted to elevate it and said bar, a bag-holding device carried by said bar, a bag-catching device also carried by said bar, a controlling-member arranged in juxtaposition to said bar and collar and adapted to engage therewith, a trip-mechanism adapted to be actuated by said controlling-member and to actuate said controlling-member and comprising a foldable support, a trip-arm, and an actuating-rod, a latching-device operatively associated with and adapted to be actuated by said trip-mechanism, a ground-supported bag-supporting and positioning device comprising a hinged door, means for actuating said door when unlatched, and bag-holding and bag-catching devices mounted on said hinged door.

23. In a mail-bag exchanging apparatus, the combination of a car-carried bag-supporting and positioning device comprising a casing, a slidable bar movably disposed in said casing, a collar encircling said casing and bar, and means associated with said collar and adapted to elevate it and said bar, a bag-holding device carried by said bar, a bag-catching device also carried by said bar, a controlling member arranged in juxtaposition to said bar and collar and adapted to engage therewith, a trip-mechanism adapted to be actuated by said controlling member and to actuate said controlling-member and comprising a foldable support, a trip-arm, an actuating-rod and a locking-device for said trip-mechanism, a latching-device operatively associated with and adapted to be actuated by said trip-mechanism, a ground-supported bag-supporting and positioning device comprising a hinged door, means for actuating said door when unlatched, and bag-holding and bag-catching devices mounted on said hinged door.

24. In mail-bag exchanging apparatus, a car provided with an opening in its bottom, a vertically reciprocating bag-supporting and positioning device disposed contiguous to said opening, means for lowering said device from a normally elevated position and positioning the same through said opening, and a ground-supported bag-catching device coöperating with said car-supported device for receiving a bag carried thereby.

25. In mail-bag exchanging apparatus, a car provided with an opening in its bottom, a vertically reciprocating bag-supporting and positioning device disposed contiguous to said opening, means for lowering said device from a normally elevated position and positioning the same through said opening, a ground-supported bag-catching device coöperating with said car-supported device for receiving a bag carried thereby, and means for positioning said device into the path of travel of said car-sustained bag-supporting device.

26. In mail-bag exchanging apparatus, the combination of a vertically movable car-carried bag-supporting and positioning device, means for moving said device into a bag-exchanging position, means for automatically returning said device to normal position a controlling-member operatively associated with and adapted to engage said device, in combination with a trip-mechanism, and a ground-sustained bag-holding and positioning-device including a bag-storing pit.

27. In mail-bag exchanging apparatus, the combination of a car-carried bag-supporting and positioning device, a controlling-member operatively associated with and adapted to engage said device, in combination with a trip-mechanism, a ground-sustaining bag-holding and positioning-device including a bag-storing pit, and a covering member overlying said pit and associated with said trip-mechanism whereby said member is latched and unlatched.

28. In a mail-bag exchanging apparatus, the combination with a car-carried catching and delivery device, means for controlling the movement of said device, an underground bag-catching and delivering device, means for positioning said underground device, and means coacting with said car-carried device for positioning the underground device into the path of said car-carried device to receive from and deliver a pouch thereto.

29. In a mail-bag exchanging apparatus, the combination with a car-carried catching and delivery device, means for controlling the movement of said device, an underground bag-catching and delivering device, means for positioning said underground device, and means coacting with said car-carried device for automatically positioning the underground device into the path of said car-carried device to receive from and deliver a pouch thereto.

30. In mail-bag exchanging apparatus, a car provided with an opening in its bottom, a bag-supporting and positioning device disposed contiguous to said opening, means for positioning the same through said opening, and a ground-supported bag-catching device normally underground and adapted to be elevated to a position in the path of said car-supported device coöperating with said car-supported device for receiving a bag carried thereby.

31. In a mail-exchanging apparatus, a car-carried changing device, an underground exchanging device, means carried by the car device coacting with a track trip-mechanism to raise the underground device into the path of travel of the car device, and means for lowering the track apparatus back underground.

In testimony whereof I hereunto set my hand this 21st day of July, 1910, in the presence of two attesting witnesses.

CLINTON W. BELL.

Witnesses:
C. A. TRINTER,
H. M KINNIN.

---

Copies of this patent may be obtained for five cents each, by addressing the "Commissioner of Patents, Washington, D. C."